United States Patent [19]

Forster

[11] 4,137,717

[45] Feb. 6, 1979

[54] HYDROSTATIC TRANSMISSION

[75] Inventor: Franz Forster, Mühlbach, Fed. Rep. of Germany

[73] Assignee: Linde AG, Wiesbaden, Fed. Rep. of Germany

[21] Appl. No.: 819,145

[22] Filed: Jul. 26, 1977

[30] Foreign Application Priority Data

Jul. 27, 1976 [DE] Fed. Rep. of Germany ....... 2633717

[51] Int. Cl.² ............................................. F16H 39/46
[52] U.S. Cl. .......................................... 60/487; 91/472
[58] Field of Search ................. 60/465, 487, 488, 489, 60/490; 91/472

[56] References Cited

U.S. PATENT DOCUMENTS

| 3,499,285 | 3/1970 | Nicholls | 60/487 |
| 3,601,981 | 8/1971 | Ifield | 60/488 |

*Primary Examiner*—Edgar W. Geoghegan
*Attorney, Agent, or Firm*—Karl F. Ross

[57] ABSTRACT

A hydrostatic transmission having an inclined-disk variable-displacement pump and a drive-flange hydrostatic motor on a common support which includes a body having a cylindrically concave surface turned toward the motor. Between the motor drum and the surface, there is provided an intermediate disk having a convex cylindrical surface adapted to ride upon the concave surface. Means is provided in the body for displacing the drum of the motor about a pivot axis which coincides with the axis of curvature of the two surfaces. The motor and pump are both axial-piston machines.

7 Claims, 2 Drawing Figures

HYDROSTATIC TRANSMISSION

CROSS-REFERENCE TO RELATED APPLICATION

The present application is related to my concurrently filed commonly assigned copending application Ser. No. 819,143, entitled HYDROSTATIC TRANSMISSION FOR TRACTORS AND THE LIKE.

FIELD OF THE INVENTION

The present invention relates to a hydrostatic transmission and, more particularly, to a transmission having an axial-piston pump using a swashplate or inclined control disk and an axial-piston motor of the drive-flange type.

BACKGROUND OF THE INVENTION

In the variable-speed transmission art it is known to provide a hydrostatic transmission which comprises a variable-displacement pump whose input shaft is driven by a prime mover, e.g. an electric motor or an internal-combustion engine, the pump being hydraulically connected to a hydraulic motor whose output shaft drives a load, e.g. a machine or a wheel or a pair of wheels of a vehicle.

In hydrostatic transmissions, the pump and the motor can each be of the axial-piston type, i.e. can be hydrostatic machines having a cylinder drum rotatable about an axis and provided with angularly equispaced cylinder bores in each of which a piston is axially reciprocable.

In such transmissions, moreover, the pump is generally of the swash-plate type. In a swash-plate pump, the input shaft is connected to the cylinder drum and rotates the latter about the axis of the cylinder drum which generally coincides with the axis of the shaft. The pistons react against an inclined disk which can be tilted at selected angles to the axis of the shaft and drum. When, for example, this inclined disk has its planar reaction surface perpendicular to the axis of the drum, the pistons do not undergo any excursion upon rotation of the drum and the pump is said to be in a neutral setting. From this neutral setting, the inclined disk can be tilted to one side or the other to varying degrees, thereby forcing the pistons during part of the rotation of the drum inwardly and drawing the pistons outwardly during another part of the rotation of the drum to alternately express fluid from and draw fluid into the respective cylinders.

The drum can cooperate with a valve plate or a surface provided with a pair of orifices which can serve as discharge and intake orifices depending upon the tilt of the inclined disk. The degree of tilt of the disk from the neutral position, therefore, determines the fluid displacement per revolution of the cylinder drum (stroke volume per revolution) while the direction of tilt determines which of the orifices is to serve as the discharge or pressure orifice and which of the orifices is to serve as the intake or suction orifice.

Manual or hydraulic servomotor means can be provided for tilting the inclinable disk of such a variable-displacement hydrostatic pump.

In such hydrostatic transmissions, moreover, the hydraulic motor may be constituted of the drive-flange type. In this type of construction, the cylinder drum is rotatable about an axis which is generally inclined to the shaft axis and the output shaft is formed with a reaction or driving flange which generally lies perpendicular to the shaft axis. The pistons of the cylinders of the drum drivingly engage the flange so that, when fluid is forced into one of the ports of the hydrostatic pump and is drained from the other, the cylinder is rotated by forcing the pistons successively outwardly to simultaneously drive the output shaft. The piston heads may engage in sockets formed in or attached to the driving flange.

The hydrostatic pump is connected to the hydrostatic motor via passages which generally connect one port of the hydrostatic motor with one port or orifice of the pump and the other port of the hydrostatic motor with the other port or orifice of the pump.

It has been found in practice (see German printed application — Offenlegungsschrift — DT-OS No. 1 816 183) that in a hydrostatic transmission in which the pump is of the inclined-disk type and the hydrostatic motor is of the drive-flange type, the advantages of both hydrostatic machine configurations are combined to provide a relatively small, light-weight and inexpensive pump configuration in association with a most effective or efficient hydraulic motor.

With this configuration, however, there have generally been three conditions which have been observed:

(a) the hydraulic motor is a constant-displacement motor, i.e. the motor has an invariable stroke volume per revolution;

(b) the hydraulic motor is provided in a construction in which the cylinder drum is surrounded by a housing whose axis determines the axis of the cylinder drum; and (c) the transmission has been provided with the hydrostatic machines in spaced or separated relationship, i.e. the hydrostatic pump is usually separated from the hydrostatic motor, the two being connected by hydraulic lines.

In practice, moreover, the configuration of the pump as an inclined-disk pump provides certain advantages as enumerated above, primarily in terms of small volume, which are lost when the hydrostatic motor is of the drive-flange type.

It should also be mentioned that there are hydrostatic transmissions which have been proposed or are in use in compact configuration, i.e. the pump and motor are disposed in a common housing. In this case, both the hydrostatic pump and the hydrostatic motor are provided in the inclined-disk configuration coaxial to one another and the cylinder drums are disposed back to back against a common body which is provided with the passages through which the fluid medium is delivered by the pump to the motor and is returned from the motor to the pump. Such constructions, however, have the disadvantage that the hydrostatic motor operates less efficiently than a motor of the drive-flange type.

OBJECTS OF THE INVENTION

It is the principal object of the present invention to provide a hydrostatic transmission which affords the advantages of the combination of an inclined-disk hydrostatic pump with a drive-flange, hydrostatic motor but without the disadvantages of earlier systems using such hydrostatic machines.

Another object of the invention is to provide a hydrostatic transmission of relatively small size and high efficiency.

SUMMARY OF THE INVENTION

These objects and others which will become apparent hereinafter are attained, in accordance with the present invention, in a hydrostatic transmission, particularly for use in a tractor as described in the aforementioned copending application, which comprises a variable-displacement hydrostatic pump of the inclined-disk type and a drive-flange hydrostatic motor which is also of a variable-displacement configuration.

According to the invention, the hydrostatic motor has a variable stroke and thus has a cylinder drum which lies against an intervening disk which, in turn, rides along a cylindrical surface. The concave cylindrical surface against which the convex cylindrical surface of this intermediate disk rides, has an axis of curvature which coincides with the pivot axis or tilt axis of the cylinder drum of the hydrostatic motor.

The concave cylindrical surface is formed on a body of the transmission housing against which the base of the cylinder drum of the hydrostatic pump bears directly or indirectly, e.g. via a valve plate or the like.

According to the invention, therefore, the hydrostatic transmission comprises a housing or body which can be provided in an elongated configuration and can have bearings at its opposite axial ends journaling respectively the input or drive shaft of the pump and the output or load-driving shaft of the hydrostatic motor, these shafts having parallel axes which are transversely offset from one another.

According to a feature of the invention, the output shaft is formed with a drive flange which lies in a plane perpendicular to the axis of this shaft and is engaged by ball-shaped heads of the pistons angularly equispaced in the cylinder drum of the hydrostatic motor. For alignment purposes, a drum shaft can be provided upon which the motor drum is rotatably journaled and which has a ball-shaped head received with freedom of universal movement in a spherical socket disposed at the center of the drive flange.

The housing for the transmission, moreover, is provided, between the motor and the pump, with a solid body formed with a cylindrically convex surface whose axis of curvature is perpendicular to the axis of the output shaft and whose radius of curvature corresponds to the radius of curvature of the convex surface of the intervening disk. Further, the convex surface of the intermediate disk rides along this concave fixed surface of the housing body.

According to another feature of the invention, the input shaft is journaled both at the end of the housing remote from the output shaft and in this body of the transmission and rotatably entrains the axial-piston drum of the pump. The pistons of this drum can be held, via respective shoes, against the inclined disk which can be mounted in the housing for tilting movement by any conventional tilting means such as a hydraulic servomotor or a manually operable lever or like device. The tilting disk is formed with an opening traversed by the input or drive shaft of the pump.

According to yet another feature of the invention, the body disposed intermediate the hydrostatic pump and the hydrostatic motor is formed with a device for displacing the cylinder drum along the concave cylindrical surface mentioned above, i.e. with a setting unit or servofollower. This servofollower can be a piston displaceable in a cylinder bore of this body along an axis which is inclined to the aforementioned shaft axes. In accordance with this aspect of the invention, this piston is provided with a pin having a ball-shaped head which engages in a recess of the intermediate disk. Furthermore, this body disposed between the axial-piston pump and the axial-piston motor can be provided with safety or pressure relief valves for the hydraulic passages traversing this body and connecting the pump with the motor and/or feed valves or other control and regulating devices for the transmission.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
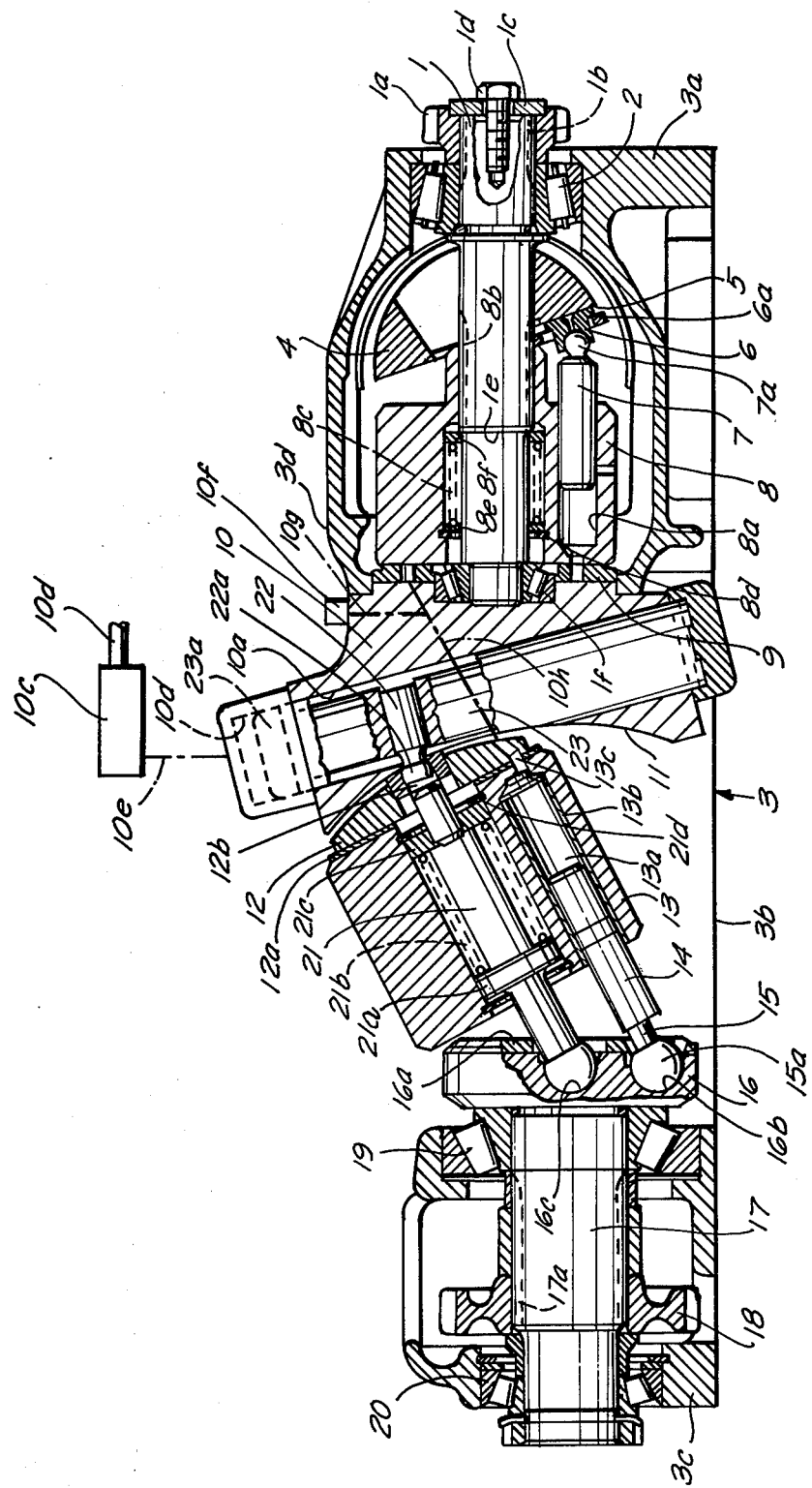
FIG. 1 is an axial cross-sectional view, somewhat in diagrammatic form, of a hydrostatic transmission according to the invention.

The hydrostatic transmission illustrated in FIG. 1 comprises a housing 3 having, at one end, a housing portion 3a adapted to form a casing 3d for the hydrostatic pump and, at the other end, a housing portion 3c forming a support for the output shaft 17, the housing portions 3a and 3c being interconnected by a central portion 3b.

The input or drive shaft 1 is journaled in the housing 3 by a first roller bearing 2 at the right-hand end of housing portion 3a and a bearing 1f in an intermediate body to be described in greater detail hereinafter and represented at 10.

The housing portion 3a also receives the inclined disk body 4, here shown as a rocker (see Ser. No. 766,150 filed Feb. 7, 1977 or Ser. No. 795,084 filed May 9, 1977), and having a planar surface 5 forming the control plane for the hydrostatic pump. The surface 5 is engaged by the shoes 6 of a plurality of angularly spaced axial pistons 7 whose ball heads 7a are received in sockets within the respective shoes 6, the latter being held against the surface 5 by a retaining disk 6a in the usual manner.

The pistons 7 are axially displaceable in respect to cylinder bores 8a of a cylinder drum 8, the cylinder bores successively communicating with ports in an antifriction valve plate 9 resting against the body 10. The ports of the body 9 are connected with the hydrostatic motor via passages in the body 10 as represented diagrammatically by the dot-dash line 10h which, moreover, is connected via a passage 10g with a pressure relief valve 10f.

The cylinder drum is angularly connected with the shaft 1 by splines 8b so that this drum is limitedly axially shiftable relative to the shaft and can be tilted to a slight extend relative thereto. The cylinder drum 8 is pressed against the plate 9 which, in turn, is pressed against the body 10. The axial pressure is applied by a spring 8c which bears against a ring 8f engaging a shoulder 1e of the shaft 1. The spring reacts against a spring seat 8e resting upon a split ring 8d fixed in a groove of the cylinder 8.

At its right-hand end, the shaft 1 is provided with splines 1b which key a drive gear 1a thereto, the gear 1a being driven by a prime mover, an internal-combustion engine as described in my aforementioned copending application Ser. No. 819,143, a disk 1c retaining the gear 1a upon the shaft via a screw 1d.

The body 10 disposed between the hydrostatic pump 4-9 and the hydrostatic motor to be described hereinafter and hence termed an intermediate body, is formed, as noted, with the passages conducting fluid between the pump and motor.

The body 10 is formed, along its side facing the hydrostatic motor, with a cylindrical surface 11 whose axis is perpendicular to the axis of shaft 17 and to the plane of the paper in FIG. 1, this axis corresponding to the tilting axis of the cylinder drum 13 of the hydrostatic motor.

An intermediate disk 12 is pressed against the concave surface 11 by a spring 21b which bears upon a seat 21c engaging, in turn, a split ring 21d fitted into a groove of the cylinder drum 13. The spring 21b reacts against a shoulder 21a of the shaft 21 upon which the cylinder drum 13 is journaled. Consequently, the disk 12, which has a convex cylindrical surface of the same radius of curvature as surface 11, can ride along the latter surface to vary the stroke (displacement) per revolution of the axial-piston motor.

The surface of the disk 12 turned toward the cylinder drum 13 has a planar surface and engages the base of the drum 13 via an antifriction layer 12a.

The cylinder drum 13 of the motor is provided with a plurality of angularly equispaced cylinders 13a formed by sleeves 13b received within bores of the cylinder 13 and communicating via ports 13c and passages 10h with the motor as previously described.

Pistons 14 are received within each of the cylinders 13a and have piston rods 15 connected to spherical heads 15a which are received in spheroidal sockets 16b of the drive flange 16 of the hydraulic motor.

The drive flange 16 is provided with a retaining disk 16a which prevents the heads 15a from withdrawing from the drive flange.

The drive flange 16 is, moreover, fixed to the drive or output shaft 17 of the transmission and lies perpendicular to the axis of this shaft 17.

The shaft 17 is journaled in bearings 19 and 20 of housing portion 3c and is formed with splines 17a which key thereto the output gear 18 adapted to drive a load, e.g. the wheels of a tractor as shown in the aforementioned copending application.

The drum shaft 21 has a ball-shaped head which is received in a socket 16c formed at the center of the drive flange 16.

In a bore 12b of the disk 12, the ball-shaped head 22a of a pin 22 engages. The pin is fixed to a setting piston 23 which is axially displaceable in a cylinder bore 10a formed in the body 10 and inclined to the shaft axis. The piston 23 is provided with a piston head 23a received in a cylinder 10b which can be supplied with hydraulic fluid via line 10e from a servomechanism 10c operated by the rod 10d to adjust the setting of the hydraulic motor.

In operation, the shaft 1 is driven to rotate the cylinder drum 8 whose pistons 7 ride via the shoe 6 against the inclined surface 5 of the rocker 4 and thus causes the pistons 7 to reciprocate, driving the pressure medium via the passage 10h, for example, into the hydraulic motor. The pressure supplied to the cylinders 13a causes excursion of the pistons 14 and hence rotates the drive flange 16 and with it the shaft 17 and the drum 13. The stroke per revolution or the displacement per revolution of the hydraulic motor can be varied by displacing the pin 22 upwardly or downwardly as will be apparent. During this displacement, the drum 13 undergoes slight axial movement toward and away from the drive flange 16 against the spring 21b as has been previously described.

To insure communication of fluid to the drum 13 in all positions of the latter, the concave surface 11 can be provided with seals 11a, 11c surrounding ports 11b, 11d which communicate with the ports of the motor cylinder 13, e.g. the port represented at 13c. A slot 10i may be provided in the surface 11 to clear the pin 22a as also will be apparent from FIG. 2.

Figure 2:
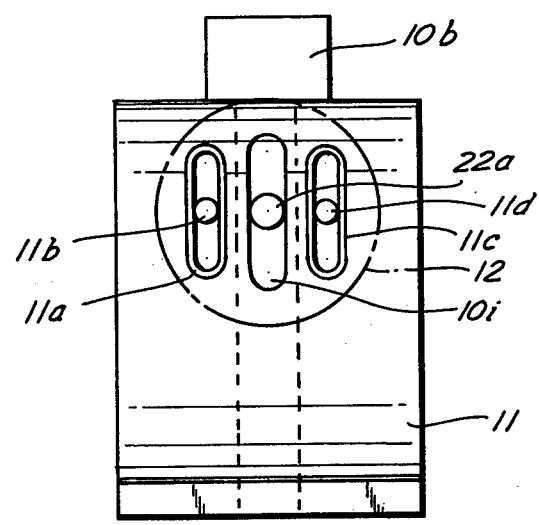
FIG. 2 is an elevational view of the concave cylindrical surface thereof.

The transmission illustrated in FIGS. 1 and 2 is preferably used in a tractor as shown in the aforementioned copending application. The means for displacing the rocker 4 can be of the type described in Ser. No. 766,150 and hence has not been described in any detail.

I claim:

1. A hydrostatic transmission comprising:
   a housing;
   a hydrostatic inclined-disk variable-displacement pump in said housing and having a cylinder drum;
   a drive-flange hydrostatic motor in said housing having a cylinder drum;
   an intermediate body in said housing between said pump and said motor, said body being formed with a cylindrically concave surface turned toward said motor and having an axis of curvature defining a tilt axis for said drum of said motor;
   an intermediate disk disposed between said drum of said motor and said surface of said body, said disk having a convex cylindrical surface and a radius of curvature corresponding to that of said concave surface and shiftable therealong, said drum of said motor bearing against said disk and urging same toward said concave surface; and
   means including a mechanism disposed in said body for displacing said disk along said concave surface, said body being formed with at least one passage hydraulically interconnecting said cylinder drums, said mechanism including a piston shiftable in said body and having a pin projecting through said concave surface and engaging said disk.

2. The transmission defined in claim 1 wherein said housing is elongated and said pump is disposed at one end of said housing, said pump further comprising:
   a drive shaft journaled in said housing at said one end thereof;
   a rocker in said one end of said housing surrounding said drive shaft and tiltable about an axis perpendicular to the axis of said drive shaft, said drum of said pump being formed with a plurality of pistons bearing against said rocker and being angularly connected with said drive shaft; and
   spring means urging said drum of said pump axially relative to said drive shaft against said body.

3. The transmission defined in claim 2 wherein said drive shaft is journaled at one end in said body.

4. The transmission defined in claim 2 wherein said hydrostatic motor comprises:
   a driven shaft journaled in said housing at the other end thereof and formed with a drive flange perpendicular to the axis of said driven shaft;
   a drum shaft carrying said drum and provided with a ball-shaped head received in a socket formed in the center of said drive flange;
   spring means bearing upon said drum shaft and upon said drum of said motor to urge said drum shaft against said disk and said disk against said concave surface;

a plurality of cylinders formed in said drum of said motor; and respective pistons axially shiftable in said cylinders of said motor drum and having ball-shaped heads received in respective sockets of said drive flange.

5. The transmission defined in claim 4 wherein said other end of said housing is provided with a pair of roller bearings rotatably journaling said driven shaft.

6. The transmission defined in claim 5, further comprising a driven gear rotatably entrained with said driven shaft in said other end of said housing and a drive gear rotatably entraining said drive shaft at said one end of said housing.

7. The transmission defined in claim 1 wherein said body is formed with at least one valve communicating with said passage.

* * * * *